Patented June 28, 1927.

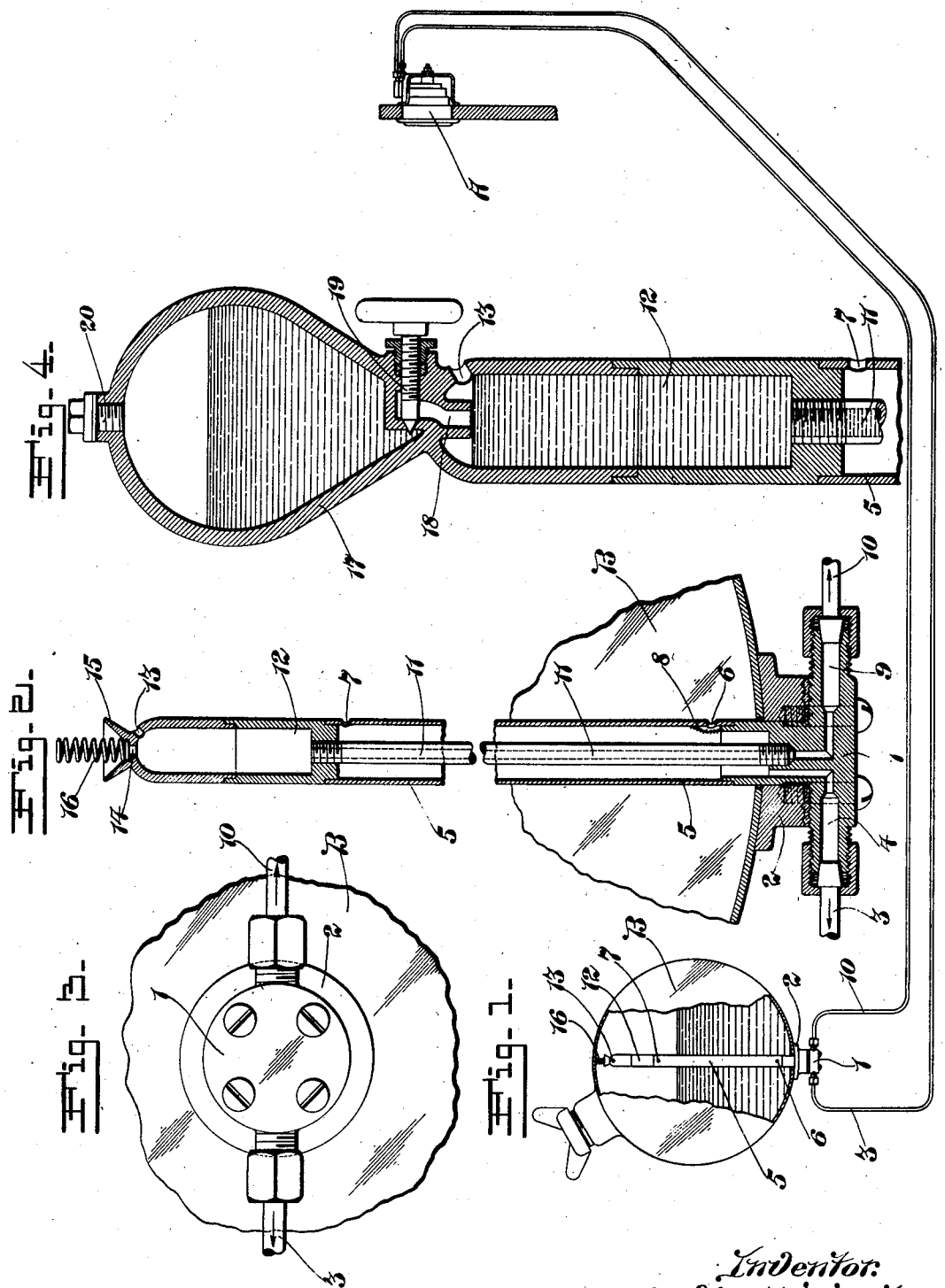

1,633,673

UNITED STATES PATENT OFFICE.

LEWIS A. MAPEL, OF ST. LOUIS, MISSOURI, ASSIGNOR TO THE AUTOMATIC APPLIANCE COMPANY, OF ST. LOUIS, MISSOURI, A CORPORATION OF MISSOURI.

LIQUID-LEVEL GAUGE.

Application filed October 25, 1920. Serial No. 419,552.

This invention relates to liquid level gauges of the type which are used for giving indication of the height, depth or quantity of liquids or the contents of liquid containers.

My invention comprises equipment for use in connection with or as a part of indicating instruments to maintain the instruments in a condition in which they will efficiently function to obtain the desired results.

The instrument in connection with or as a part of which the present invention is used comprises an indicating device arranged and designed to give indication of the height, depth or quantity of a body of liquid, or the contents of liquid containers.

The present invention comprises means for maintaining proper communication between the liquid, the height, depth or quantity of which is to be indicated by the indicating device, and a continuous column of liquid communicating with said indicating device, means for preventing loss or decrease of the liquid in a second continuous column of liquid from the indicating device of the instrument, and means for maintaining an equalized condition above the level of the liquid the height, depth or quantity of which is to be indicated and above the level of the liquid in the equipment which is comprised in the present invention.

The present invention also comprises means for replacing any loss or decrease of the liquid that might occur in the equipment which is the subject-matter of this invention, and an object of the present invention is to provide an efficient and satisfactory equipment for obtaining the results mentioned in a satisfactory manner.

Another object of the invention is to provide equipment for an indicating instrument of the character mentioned which may be conveniently installed and placed in condition for use and which will be maintained in such condition continuously and automatically and as an incident to use of the instrument without the necessity of removal or replacement of any of the parts thereof, so long as the parts remain unbroken and otherwise in proper condition for use.

Another object of the invention is to provide means for maintaining the source of one of the columns of liquid of the indicating instrument in direct communication with the conditions above the level of the body of liquid the height, depth or quantity of which is to be indicated, by means of which loss or decrease of liquid in the column of liquid is normally prevented, and by means of which any loss or decrease of liquid that might occur is replaced, and by means of which both columns of liquid are maintained subject to the same conditions existing in the instrument and in the liquid receptacle.

Another object of the invention is to provide means for preventing the effects of the surging and disturbance of the body of liquid from being transmitted to or from affecting the indicating device, leaving the indicating device under the influence of the weight of undisturbed liquid in the receptacle so that the indicating device will at all times give a correct indication of the height, depth or quantity of the liquid in the receptacle whether the liquid be in a disturbed or surging condition, or not.

Another object of the invention is to provide novel and efficient means for replacing any loss of liquid that might occur at the source of one of the columns.

Various other objects will be made apparent from the following description without specific mention thereof at this point, reference being made to the drawings, in which—

Fig. 1 is a view illustrating the general arrangement of an indicating instrument when applied to an automobile to indicate the approximately exact height, depth or quantity of liquid fuel in the supply tank, the indicating device being located on the instrument board and the present invention being embodied in the instrument.

Fig. 2 is a vertical broken sectional view of the present invention.

Fig. 3 is a view showing the lower end of the base of the fitting included in the present invention.

Fig. 4 is an enlarged sectional view showing a form of the device which may be used to minimize the loss or decrease of liquid that might occur in the chamber constituting the source of one of the columns of liquid in connection with the indicating device, and to replace any such loss or decrease of the liquid that might occur.

As shown in Fig. 1, which is a diagrammatic view of the indicating instrument applied to an automobile, the indicating device A is supported in a position convenient for observation and, as shown, this may be on the instrument board of an automobile. In this use of an indicating instrument containing the present invention the instrument affords constant indication of the approximately exact height, depth or quantity of liquid contained in the fuel tank B, and any variations in the height, depth or quantity of said liquid. It will be understood, however, that my invention is not limited to such a use and that I do not restrict or limit myself to any particular or specific uses of the invention.

The important features of the present invention are more clearly shown in Figs. 2, 3 and 4. As shown in Figs. 2 and 3, the base 1 of the fitting is secured to a flange 2 which is in connection with the tank B. A pipe 3 from the indicating device A communicates with a passage 4 through the base of the fitting. The passage 4 extends through the base of the fitting and opens into a tube 5 which, as shown, may be secured to an extended part of the base 1, within the tank B. As more clearly shown in Fig. 1, the tube 5 extends through the liquid in the tank B and (Fig. 2) near its lower end is provided with an opening 6 which permits the liquid in the tank B to enter the tube 5 so long as there is any appreciable quantity or depth of liquid in the tank.

An opening 7 is provided near the upper end of the tube 5. The provision of the openings 6 and 7 in the tube 5 permits the level of the liquid in the tube to correspond with the level of the liquid in the tank, so that the indicating device A will afford a correct indication of the height, depth or quantity of liquid contained in the tank. The opening 6 may be provided with an appropriately arranged filter 8 which will prevent any sediment or other foreign substances from passing into the tube 5 and entering the passages leading to the indicating device. I do not limit myself to a construction in which the filter 8 must essentially be used, since it is apparent that if the liquid is entirely clear and free from sediment and other foreign substances the filter will not be required. The provision of the opening 7 at the upper end of the tube 5 permits the air to pass out of the tube as the tube becomes filled with liquid through the opening 6 during the filling of the tank; and it also permits air to enter the tube as the level of the liquid in the tank is lowered, thereby maintaining the level of the liquid within the tube uniform with the level of the liquid outside of the tube and within the tank. The level of the liquid within the tube therefore varies with the level of the liquid in the tank, so that a correct indication of the height, depth or quantity of liquid in the tank will be given by the indicating device at all times.

The tube prevents surging and agitation of the liquid within the tube, even though the liquid in the tank be in agitation. This prevents the effect of the agitated liquid in the tank from affecting the indicating device, and leaves the indicating device properly under the influence of the liquid at the source of the passages 3 and 4, corresponding to the normal height or depth of the liquid in the tank when said liquid is not in agitation.

A passage 9 is in communication with a pipe 10 leading to the indicating device A. Said passage 9 continues through the base 1 of the fitting and is in communication with a stand pipe 11 enclosed within the tube 5. The lower end of the stand pipe 11 is secured to the base 1 of the fitting and the upper end of said tube is attached to and communicates with the chamber 12, the bottom of which is fitted to the tube 5 which serves to support said chamber and the parts in connection therewith. The chamber 12 is designed to contain liquid which is at the source of the liquid filling the stand pipe 11 and the pipe 10. The relative area of the chamber 12 to the combined area of the passage through the tube 11, the passage 9 and the pipe 10 is such that the height of the liquid in the chamber 12 is not materially changed by maximum expansion or contraction of the liquid in the pipe 10 and its outlet.

A vent 13 is provided near the upper end of the chamber 12, said vent opening outwardly to a portion of the wall of the chamber which is so arranged and designed that it will not retain liquid therein sufficient to seal the vent and prevent air from being excluded from the chamber or prevent liquid from entering the chamber in the manner presently described. The upper end of the chamber is provided with an opening 14 which admits liquid into the chamber to replace any loss or decrease of liquid that might occur in the chamber. The opening 14 is at the bottom of a funnel or collector 15 which serves to cause liquid accumulated from immersion or splash of the liquid in the tank to pass through the opening 14 into the chamber. The liquid in the chamber will be maintained at a constant level because of the presence of the vent 13 which permits the air to pass from the chamber as the liquid enters the chamber from the funnel and which also permits any excess of liquid to pass from the funnel 15, through the opening 14 and through the vent 13. This is a highly important feature of the invention, since in order to obtain best results it is necessary that the liquid within the chamber 12 be maintained at a constant level.

As shown, the funnel 15 may be equipped with means for gathering liquid and permitting the liquid to flow through the opening 14. As shown, the gatherer may be in the form of a coiled spring 16 having its lower end engaged in the bottom of the funnel 15 and its upper end abutting against the wall of the tank. Any quantities of liquid which accumulate on the gatherer are free to flow thereon into the funnel 15 and thence through the opening 14 into the chamber 12. Air and excess quantities of liquid pass from the chamber 12 through the vent 13 as previously explained, so that the liquid in the chamber is maintained at a constant level.

It will be seen that in the construction and arrangement above described, the liquid in the pipe 10 has its source through the passage 9 in the stand pipe 11 in the liquid in the chamber 12, which is above the level of the body of liquid in the tank B, and which is in direct communication with the conditions above the level of the liquid in the tank.

It is known that liquid confined in a closed tank causes saturation of the air in the tank above the liquid and by the provision of the vent or opening in the chamber above the level of the liquid therein, the saturated air in the tank is kept in direct communication with the interior of the chamber 12, thereby preventing loss or decrease of the liquid in said chamber. This maintains the same condition above the level of the liquid in the chamber 12 as exists above the level of the liquid in the tank, and prevents changes such as barometric changes, changes in temperature, changes in pressure, or other changes from differently affecting the conditions in the chamber 12 and in the tank B.

In the construction shown in Fig. 4, a reservoir 17 at the upper end of the chamber 12 has a nozzle 18 extending into the chamber and terminating at a level at which it is desired to maintain the liquid in said chamber. The liquid in the chamber 12, when at the proper level, seals the lower end of the nozzle 18 and thus prevents flow of the liquid from the reservoir 17 until some loss or decrease of liquid occurs in the chamber 12. When there is any loss or decrease of liquid in the chamber 12 air from said chamber is admitted through the nozzle 19 into the reservoir 17. The air passing into the reservoir 17 rises above the level of the liquid therein and displaces a sufficient quantity of the liquid to fill the chamber 12 until the lower end of the nozzle 18 is sealed. Thereupon the passage of the air into the reservoir and the passage of the liquid from the reservoir is discontinued, until some loss or decrease of liquid again occurs in the chamber 12, whereupon the operation is automatically repeated.

A valve 19 is provided and may be used to close the opening from the reservoir into the nozzle 18 when it is desired to fill the reservoir. It is to be understood that when the invention is in use the valve 19 is kept open so that the operations above described will occur automatically and as an incident to the existence of the conditions rendering such operations desirable or useful.

When the liquid in the reservoir 17 becomes exhausted the same may be replenished by closing the valve 19 and removing the plug 20. Liquid is then delivered into the reservoir, after which the plug 20 is replaced and the valve 19 opened, and the device placed in use.

It will be seen that in accordance with this invention means is provided for establishing a datum level for the indicating device and that this datum level is maintained uniform. The stand pipe or reservoir 11 and its enlargement 12 maintains a column of liquid, which in the specific embodiment shown and described, maintains on the diaphragm or element a constant pressure, while the connection from the tank to the indicating device applies to the diaphragm or element a pressure varying in accordance with the head of the liquid in the tank. Accordingly the pipe 11 and its connections to the instrument establishes a datum level, that is a level from which the readings of the instrument are taken. This datum level is not only established but is also maintained uniform, by the provision of means which operates automatically to maintain the column in the pipe at a uniform height. This automatic means comprises in Figure 2 the cup or collector 15 which is positioned to receive the splashing liquid in connection with the spring 16 which forms a gathering element engaging the top of the tank to gather the liquid and direct it into the cup.

In Figure 4 the automatic means comprises the reservoir 17 and its connection 18 which automatically maintains the level of the liquid in the pipe 11 and its enlargement 12 uniform. Accordingly the diaphragm or element of the indicating device is always responsive to the varying head of the liquid in the tank.

In the construction of Figure 2 the stand pipe has an enlargement provided with a cup or collector which has a flared opening but has a restricted port 14 adapted to admit the splashing liquid to the pipe in order to restrict the evaporation of the liquid from the pipe. This collector also has an overflow 13 in order to fix the datum level. In accordance with this invention, however, the pipe rises within the tank while the collector or other automatic means for maintaining the datum level uniform automatically, is above the normal level of the liquid in the tank so as to maintain on the diaphragm or element a constant head greater than the normal varying head of the liquid. Accordingly the maintenance of the established datum level is attained in a convenient and effective manner without the use of float chambers or other mechanically moving parts.

From the foregoing description it will be seen that my invention accomplishes all of its intended objects and that it is capable of a wide range of uses. The utility of the invention is not restricted to the specific purposes mentioned, nor to a connection with the liquid fuel tank of an automobile. The invention may be used with equal efficiency for various purposes.

I do not restrict myself to unessential features or limitations, but I contemplate all desirable variations in the construction and arrangement of the parts that may be within the scope of the appended claims.

What I claim and desire to secure by Letters Patent, is:—

1. An apparatus for indicating the head of a liquid in a vehicle tank wherein the liquid splashes while the vehicle is in motion, comprising, an indicating device connected with the tank and having an element which is responsive to the varying head of the liquid in the tank, means cooperating with and for establishing a datum level for said indicating device, including a cup arranged within the tank and spaced from the wall thereof, and a liquid gathering element arranged to engage the wall of the tank and leading to said cup in order to maintain such datum level.

2. An apparatus for indicating the head of a liquid in a vehicle tank wherein the liquid splashes while the vehicle is in motion, comprising, an indicating device connected with the tank and having an element which is responsive to the varying head of the liquid in the tank, means cooperating with and for establishing a datum level for said indicating device, including a pipe rising within the tank and in which a column of liquid is adapted to stand, and a liquid gathering element arranged to engage the top of the tank and draining to said pipe in order to maintain such datum level.

3. An apparatus for indicating the head of a liquid in a vehicle tank wherein the liquid splashes while the vehicle is in motion, comprising, an indicating device connected with the tank and having an element which is responsive to the varying head of the liquid in the tank, means for establishing a datum level for said indicating device, including a pipe rising within the tank and in which a column of liquid is adapted to stand, the terminal of said pipe being formed to catch the splashing liquid, and a liquid gathering element arranged to engage the wall of the tank and cooperating with said terminal in order to maintain such datum level.

4. An apparatus for indicating the head of a liquid in a vehicle tank wherein the liquid splashes while the vehicle is in motion, comprising, an indicating device connected with the tank and having an element which is responsive to the varying head of the liquid in the tank, means for establishing a datum level for said indicating device, including a pipe rising within the tank and in which a column of liquid is adapted to stand, a cup at the upper end of said pipe, and a liquid gathering element in said cup and adapted to engage the top of the tank in order to maintain the datum level.

5. An apparatus for indicating the head of a liquid in a vehicle tank wherein the liquid splashes while the vehicle is in motion, comprising, an indicating device connected with the tank and having an element which is responsive to the varying head of the liquid in the tank, means for establishing a datum level for said indicating device, including a pipe rising within the tank and in which a column of liquid is adapted to stand, a cup at the upper end of said pipe and having a restricted connection therewith, and a liquid gathering element in said cup and adapted to engage the top of the tank in order to maintain such datum level.

6. An apparatus for indicating the head of a liquid in a vehicle tank wherein the liquid splashes while the vehicle is in motion, comprising, an indicating device connected with the tank and having an element which is responsive to the varying head of the liquid in the tank, means for establishing a datum level for said indicating device, including a pipe rising within the tank and having an overflow so as to provide a liquid column of a predetermined height, a cup at the upper end of said pipe, and a liquid gathering element in said cup and adapted to engage the top of the tank in order to maintain such datum level.

7. An apparatus for indicating the head of a liquid in a vehicle tank wherein the liquid splashes while the vehicle is in motion, comprising, an indicating device connected with the tank and having an element which is responsive to the varying head of the liquid in the tank, means for establishing a datum level for said indicating device, including a pipe rising within the tank and having an overflow so as to provide a liquid column of a predetermined height, a cup at the upper end of said pipe and having a restricted connection therewith, and a liquid gathering element in said cup and adapted to engage the top of the tank in order to maintain such datum level.

LEWIS A. MAPEL.